United States Patent
Kuriyama et al.

[11] Patent Number: 5,667,457
[45] Date of Patent: Sep. 16, 1997

[54] HYDRAULIC CONTROL SYSTEM OF AUTOMATIC TRANSMISSION

[75] Inventors: Minoru Kuriyama, Higashi-Hiroshima; Kazuo Sasaki, Hiroshima, both of Japan

[73] Assignee: Mazda Motor Corporation, Hiroshima, Japan

[21] Appl. No.: 375,013

[22] Filed: Jan. 19, 1995

[30] Foreign Application Priority Data

| Jan. 20, 1994 | [JP] | Japan | 6-021938 |
| Mar. 31, 1994 | [JP] | Japan | 6-087879 |

[51] Int. Cl.$^6$ ............................................. F16H 61/26
[52] U.S. Cl. .......................... 477/156; 477/158; 477/159
[58] Field of Search ........................ 477/120, 154, 477/143, 148, 156, 158, 159, 160, 162; 475/123, 125

[56] References Cited

U.S. PATENT DOCUMENTS

| 4,584,905 | 4/1986 | Eschrich et al. | |
| 5,029,492 | 7/1991 | Kiuchi | 477/143 X |
| 5,151,858 | 9/1992 | Milunas et al. | 477/155 X |
| 5,188,005 | 2/1993 | Sankpal et al. | 477/155 X |
| 5,211,083 | 5/1993 | Hattori et al. | 477/39 |
| 5,305,663 | 4/1994 | Leonard et al. | 477/155 X |
| 5,337,239 | 8/1994 | Okuda | 477/155 X |
| 5,443,427 | 8/1995 | Ataka et al. | 477/148 X |
| 5,492,508 | 2/1996 | Tsukamoto et al. | 475/125 |
| 5,505,675 | 4/1996 | Kurikyama et al. | 477/156 |

FOREIGN PATENT DOCUMENTS

| 1-098745 | 4/1989 | Japan . |
| 1-150056 | 6/1989 | Japan . |
| 4-072099 | 11/1992 | Japan . |

*Primary Examiner*—Charles A. Marmor
*Assistant Examiner*—Peter T. Kwon
*Attorney, Agent, or Firm*—Keck, Mahin & Cate

[57] ABSTRACT

A hydraulic control system for an automatic transmission comprising a shift speed mechanism, a frictional element hydraulically controlled for switching a power transmitting path in the shift speed mechanism, a working pressure controller for controlling an engaging force of the frictional element during a shift operation by adjusting a working pressure applied to the frictional element, a calculator for calculating separately an input torque pressure corresponding to an input torque introduced to the shift speed mechanism and an inertia torque pressure corresponding to an inertia torque which is changed in accordance with a speed change of the shift speed mechanism, and a learning control compensator for compensating the inertia torque pressure by means of a learning control. The shift shock is effectively suppressed irrespective of the change of the vehicle operating circumstance.

20 Claims, 15 Drawing Sheets

FIG. 14

| SHIFT STAGE | 4th |
|---|---|

| SHIFT STAGE | 3rd |
|---|---|

| SHIFT STAGE | 2nd | | | | | | |
|---|---|---|---|---|---|---|---|
| SPEED CHANGE AMOUNT | dN1 | dN2 | dN3 | --- | --- | --- | dNn |
| LEARNED HYDRAULIC PRESSURE | --- | --- | Pgx | --- | --- | --- | --- |

FIG. 15

| SPEED CHANGE AMOUNT | dN1 | dN2 | dN3 | --- | --- | --- | dNn |
|---|---|---|---|---|---|---|---|
| LEARNED HYDRAULIC PRESSURE | --- | --- | Pgx | --- | --- | --- | --- |

HYDRAULIC CONTROL SYSTEM OF AUTOMATIC TRANSMISSION

BACKGROUND OF THE INVENTION

1. Field of the Invention

The present invention relates to a hydraulic control system of an automatic transmission, in particular, to a control system of an engaging force of frictional elements during a shift operation.

2. Related Art

Generally, an automatic transmission for an automotive vehicle is provided with a torque converter and a shift speed mechanism which is combined with the torque converter. A plurality of frictional elements of the shift speed mechanism is selectively switched to change a power transmitting path to establish a predetermined shift stage in accordance with a driver's need and/or an driving condition. For this purpose, the automatic transmission is provided with a hydraulic control circuit which produces a line pressure for engaging the frictional elements. If the line pressure is too low compared with an input torque for a frictional element, a torque transmission amount of the frictional element is short to transmit a desired torque amount. Conversely, when the line pressure is too high, for instance, a torque amount for driving an oil pump is increased beyond an appropriate level to consume an engine output undesirably. This means the fuel consumption efficiency is deteriorated.

In view of this, the line pressure is controlled based on a throttle valve opening by which the engine output torque is controlled because the input torque introduced to the frictional element generally corresponds to the engine output torque. As a result, the line pressure is controlled so as to match the line pressure to the input torque of the frictional element.

Meanwhile, in order to avoid a substantial change in a vehicle speed during the shift operation, an input speed (turbine speed) is changed so as to a target gear ratio. In an up-shift operation in which the input speed is reduced, a torque amount of the frictional element involved in the shift operation is increased by an amount for an inertia torque which is necessary to reduce the turbine speed. On the contrary, in a down-shift condition in the case where the input speed is increased, the torque amount of the frictional element involved in the shift operation is reduced by an amount for the inertial torque which is necessary to increase the input speed.

Thus, an optimized line pressure cannot be obtained only by setting the line pressure based on the input torque introduced to the shift speed mechanism. As a result, the line pressure does not correspond to the required hydraulic pressure for the frictional element. For example, when the line pressure is too high relative to the required pressure, the shift operation period is undesirably shortened to produce an uncomfortable shift shock. When the line pressure is too low relative to the required hydraulic pressure, the shift operation period is undesirably elongated so that a shift feeling is deteriorated.

In order to deal with the above problem, Japanese Patent post-examination publication No. 4-74099 discloses that a operation pressure or the line pressure is determined taking account of the input torque introduced to the shift speed mechanism and the inertia torque caused by a speed change in the shift speed mechanism during the shift operation. This technique focuses on the fact that the engine speed is changed so as to correspond to the output speed of the shift speed mechanism. According to the above control disclosed in the Japanese publication No. 4-74099 which was opened to the public in 1992, it is expected that the shift operation can be completed in a shortened time period without producing an undesirable shift shock.

On the other hand, Japanese Post-examination publication No. 1-98745, which was opened to the public in 1989, discloses a control in which a change rate of the input speed of the shift speed mechanism is detected so that the working hydraulic pressure (including the line pressure) for a next shift operation is compensated by means of a learning control based on a difference between the change rate and a predetermined target speed change rate. Japanese Post-examination publication No. 1-15006, which was opened to the public in 1989, discloses a control in which the operating hydraulic pressure in a later stage of the shift operation for a hydraulic circuit having an accumulator damping the is operating pressure introduced to the frictional elements compensated by means of the learning control based on the comparison between the speed change rate in the shift speed mechanism and a predetermined speed change rate.

There is a following problem in the control as disclosed in the Japanese patent publication No. 4-72099 in which the operating pressure is determined based on the input torque introduced to the shift speed mechanism and the inertia torque.

The characteristics of the automatic transmissions depend on the products due to variations between elements thereof as well as the engines which are combined with the automatic transmissions. Thus, in order to obtain the optimized shift speed characteristics, it is necessary to tune each of the combinations of the automatic transmission and engine. Otherwise, the working efficiency is deteriorated. Even if the optimized tuning is made at the beginning, the shift speed characteristics are changed as the time goes.

In order to cope with this problem, it is proposed that the operating pressure applied to the frictional element during the shift operation is compensated by means of the learning control utilizing the control as disclosed in the Japanese patent publications Nos. 1-98745 and 1-150056.

It should, however, be noted that the compensation is made for the hydraulic pressure corresponding to the total value of the input torque and inertia torque in the control as disclosed in the above Japanese patent publication. Consequently, for example, the result of the learning control in the high altitude where an intake air density is relatively low is different from that in the low altitude where the intake air density is relatively high. As a result, the shift operation time period is slightly changed, for example, just after the vehicle is moved between the low and high altitudes. This means that such control cannot follow up the change of the circumstance.

In addition, the conventional learning control produces a relatively large variation in the result of the learning control so that a sophisticated result of the learning control cannot be obtained.

SUMMARY OF THE INVENTION

It is therefore an object of the present invention to solve the above problems in the automatic transmission in which an engaging force of a frictional element forming a power transmitting path in the shift speed mechanism is controlled by adjusting the working hydraulic pressure applied to the frictional element.

It is another object of the present invention to accomplish a learning control of a working hydraulic pressure which can deal with a change of a driving circumstance.

It is further object of the present invention to accomplish an accurate learning control of the working hydraulic pressure.

The above and other objects of the invention can be accomplished by a hydraulic control system for an automatic transmission comprising a shift speed mechanism, a frictional element hydraulically controlled for switching a power transmitting path in the shift speed mechanism, a working pressure controller for controlling an engaging force of the frictional element during a shift operation by adjusting a working pressure applied to the frictional element, a calculator for calculating separately an input torque pressure corresponding to an input torque introduced to the shift speed mechanism and an inertia torque pressure corresponding to an inertia torque which is changed in accordance with a speed change of the shift speed mechanism, and a learning control compensator for compensating the inertia torque pressure by means of a learning control.

In a preferred embodiment of the present invention, the hydraulic control system for an automatic transmission comprises a target shift time setting device for setting a target shift time based on a speed change amount of an input member of the shift speed mechanism through the shift operation and an input torque introduced to the shift speed mechanism, a target acceleration calculator for calculating a target angular acceleration of the input member during the shift operation based on the target shift time and the speed change amount of the input member, a hydraulic pressure setting device for setting the working pressure based on the angular acceleration and the input torque calculated by the target acceleration calculator, acceleration detector for detecting an actual angular acceleration of the input member of the shift speed mechanism during the shift operation, an angular acceleration detecting device for detecting an actual angular acceleration of the input member of the shift speed mechanism, and a learning control compensator for compensating the working pressure for a next shift operation based on a difference between a mean angular acceleration of the input member after the shift operation and the target angular acceleration of the input member by means of the learning control in an up-shift operation where a vehicle is positively driven by an engine output.

On the other hand, the target acceleration setting device calculates the target angular acceleration of the member during the shift operation based on the input target shift time and the speed change amount of the input member in a down-shift operation where the vehicle is negatively driven by an inertia of the vehicle.

In a preferred embodiment, the hydraulic control system the further comprises a torque down device for executing a torque down control during the shift operation under a predetermined condition and the learning control compensator compensates the working pressure by means of the learning control even when the torque down control is not executed.

Preferably, a learning control value is determined by the learning control compensator for each target shift stage. In another embodiment, the learning control value is determined based on the speed change amount of the input member of the shift speed mechanism through the shift operation.

In another aspect of the invention, the hydraulic control system is provided with an inertia torque pressure setting device for setting an inertia torque pressure based on the target angular acceleration, an input torque pressure setting device for setting an input torque pressure based on said input torque introduced to the shift speed mechanism, a hydraulic pressure setting device for setting the working pressure based on the angular acceleration and the input torque calculated by the target acceleration calculator, acceleration detector for detecting an actual angular acceleration of the input member of the shift speed mechanism during the shift operation, an angular acceleration detecting device for detecting an actual angular acceleration of the input member of the shift speed mechanism, and a learning control compensator for compensating the working pressure for a next shift operation based on a difference between a mean angular acceleration of the input member after the shift operation and the target angular acceleration of the input member by means of the learning control in an up-shift operation where a vehicle is positively driven by an engine output.

In this case, the hydraulic control system further comprises a target torque setting device for setting a target torque transmitted through the shift speed mechanism based on said target angular acceleration and the input torque pressure setting means sets the input torque pressure based on said target torque.

In another embodiment of the present invention, the hydraulic control system comprises a shift hydraulic pressure setting device for setting the working pressure based on said input torque, inertia pressure and a compensation coefficient related to a hydraulic temperature determined taking account of a frictional coefficient of the frictional element involved in the shift operation, an angular acceleration detecting device for detecting an actual angular acceleration of the input member of the shift speed mechanism, an inertia torque pressure inference device for inferring the inertia torque pressure during the shift operation based on a mean angular acceleration of said rotation speed of the input speed of the shift speed mechanism when the shift operation is completed, and learning control compensator for compensating the compensation coefficient for a next shift operation by means of a learning control based on said inferred inertia torque pressure, the inertia torque pressure set by the inertia torque pressure setting device and the input torque pressure set by the input torque pressure setting device.

According to the present invention, the inertia torque pressure is compensated by the learning control. As a result, the working pressure or line pressure applied to the frictional element of the shift speed mechanism involved in the shift operation is appropriately compensated in accordance with a change of the driving circumstances. The target shift time is determined based on the angular acceleration and input torque of the input member of the shift speed mechanism. The working pressure is determined based on the angular acceleration and input torque so as to accomplish the target shift time. This means that the hydraulic pressure can be determined in response to the driving condition. The mean angular acceleration of the input member is used as a learning control parameter so that an accurate learning control can be accomplished and thus, the working pressure for the frictional element can be also accurately provided.

In preferred embodiment, the input torque pressure matches appropriately the actual input torque during the shift operation in an automatic transmission in which the torque down control is carried out. This effect can be obtained in a down-shift operation in a negative driving condition or driven condition where the vehicle runs by virtue of its own inertia. Specifically, the shift operation can be quickly completed while an undue shift shock can be suppressed pressed where the shift operation is made by manual to a shift stage in which an engine brake is effected.

According to another aspect of the present invention, the working pressure for the frictional element involved in the shift operation is compensated by means of the learning control irrespective of the execution of the torque down control so that the hydraulic pressure is controlled appropriately in response to the driving condition.

Where the learning control value by the learning control compensator is determined for each shift stage, a memory capacity can be saved. In a preferred embodiment, the learning control value is set in accordance with the speed change of the input member through the shift operation so that an accurate learning control can be made irrespective of the speed change of the input member even when the frictional coefficient of the frictional element is changed due to the change of the hydraulic temperature.

The inertia torque pressure during the shift operation is inferred based on a mean angular acceleration of said rotation speed of the input speed of the shift speed mechanism when the shift operation is completed. The learning control coefficient compensator compensates the compensation coefficient for a next shift operation by means of a learning control based on said inferred inertia torque pressure, the inertia torque pressure set by the inertia torque pressure setting device and the input torque pressure set by the input torque pressure setting device. Therefore, even if the inertia torque pressure is not changed greatly, the hydraulic control can be well converged.

Further objects, features and advantages of the present invention will become apparent from the Detailed Description of Preferred Embodiments which follows when read in light of the accompanying Figures.

BRIEF DESCRIPTION OF THE DRAWINGS

FIG. 14 is a view showing maps each showing a relationship between the learned hydraulic pressure, speed change amount and shift stage according to another embodiment;

FIG. 15 is a view showing a map of the learned hydraulic pressure and the speed change amount according to another embodiment;

DETAILED DESCRIPTION OF THE PREFERRED EMBODIMENTS

Figure 1:
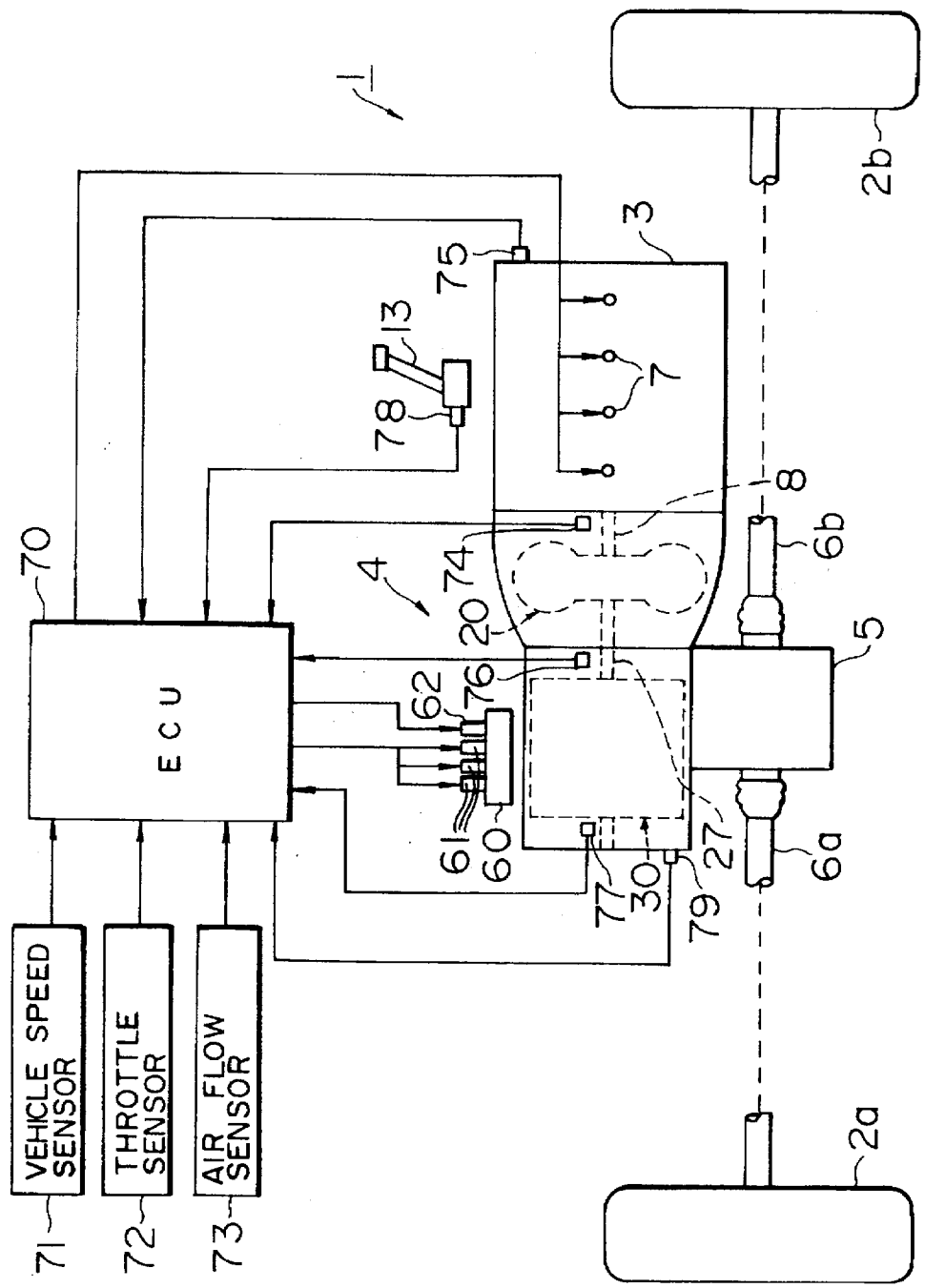
FIG. 1 is a schematic view of an engine and automatic transmission to which a shift control system in accordance with a preferred embodiment of the present invention.

Referring to FIG. 1, a vehicle to which the present invention can be applied is provided with a right and left front wheels 2a and 2b as drive wheels, engine 3, automatic transmission 4 and drive shafts 6a and 6b. An engine output torque is transmitted to the front wheels 2a and 2b through the automatic transmission 4 and the drive shaft 6a, 6b. The engine 3 is provided with ignition plugs 7.

Figure 2:
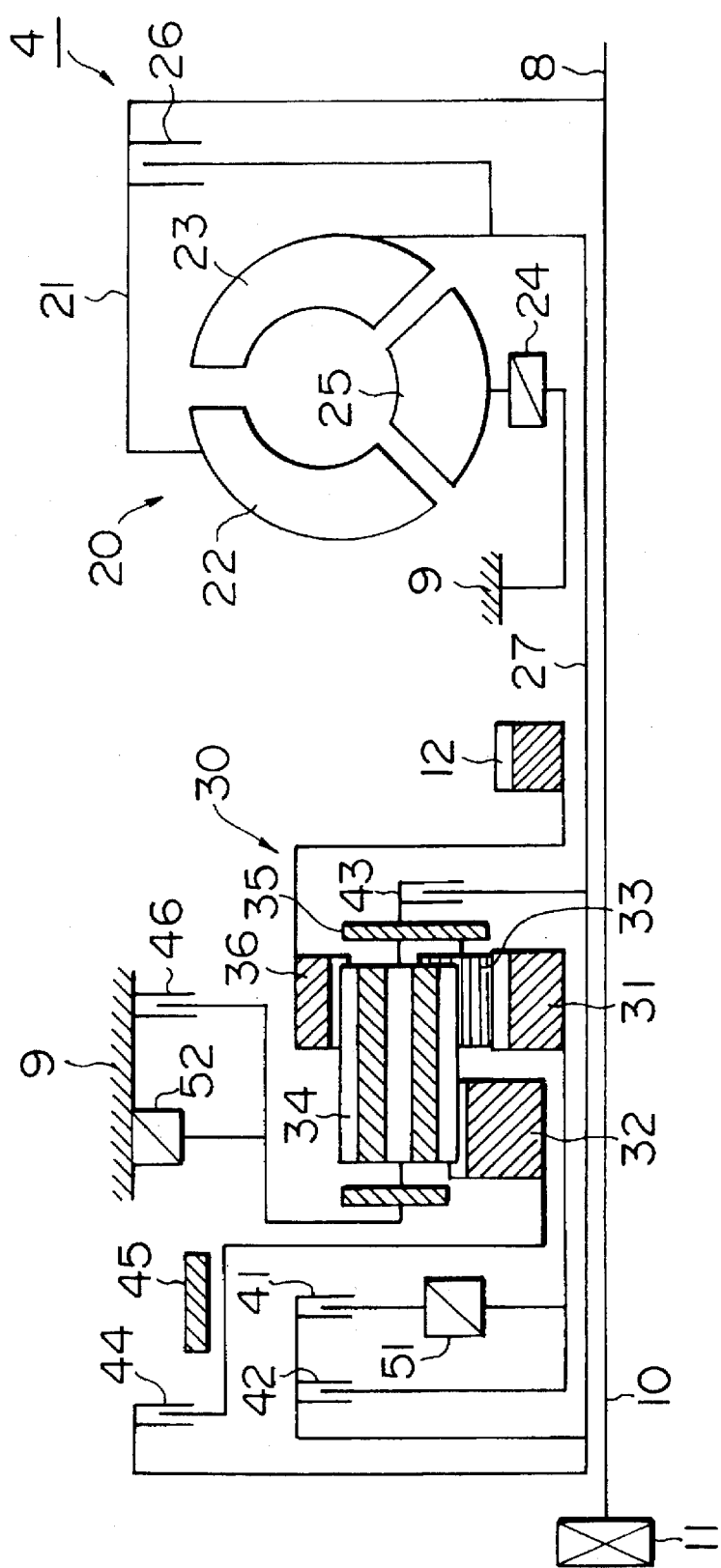
FIG. 2 is a skeleton of the automatic transmission.

As shown in FIG. 2, an automatic transmission 4 includes a torque converter 20 which is connected to an output shaft 3 of the engine 3, a transmission gear mechanism or shift speed mechanism 30 to which the engine output torque (turbine torque) is introduced, a plurality of frictional elements 41–46, such as clutches and brakes for switching a power transmitting path of the shift speed mechanism 30, one way clutches 51 and 52 and a hydraulic pressure control unit 60 for switching the shift ratio (shift stage) of the shift speed mechanism 30 so that running ranges D, S, L and R and shift stages 1-4 in the D range, 1-3 in the S range and 1 and 2 in the L range can be obtained.

The torque converter 20 is provided with a pump 22 integral with a transmission case 21 connected with an output shaft 8 of an engine, a turbine 23 disposed facing the pump 22 and driven thereby through a hydraulic fluid, a stator 25 disposed between the pump 22 and turbine 23 and carried by the converter case 21 through a one way clutch 24 and a lockup clutch 26 for directly connecting the output shaft 8 with the engine output shaft 2 through the converter case 21. A rotation of the turbine 23 is transmitted to the shift speed mechanism 30 through a turbine shaft 27. To the engine output shaft 8 is connected a pump shaft 10, which passes through the turbine shaft 27, drives an oil pump 11 which is disposed at a rear end portion of the shift speed mechanism 30.

The transmission gear mechanism 30 is constituted by Ravigneaux-type planetary gear mechanism and provided with a a small sun gear 31 arranged over the turbine shaft 27, a large sun gear 32 arranged over the turbine shaft 27 rearward of the small sun gear 31, a plurality of short pinion gears 33 meshed with the small sun gear 31, long pinion gear 34 of which rear portion is meshed with the large sun gear 32, a carrier 35 rotatably supporting the long pinion gear 34 and the short pinion gear 33 and a ring gear 36 meshed with the long pinion gear 34.

Between the turbine shaft 27 and small sun gear 31 are disposed a forward clutch 41 and a first one way clutch 51 in tandem. A coast clutch 42 is juxtaposed with the clutch 41 and 51. A 3-4 clutch 43 is disposed between the turbine shaft 27 and the carrier 35. A reverse clutch 44 is disposed between the turbine shaft 27 and the large sun gear 32. Between the large sun gear 32 and the reverse clutch 44 is disposed a 2-4 brake 45 of a band brake for fixing the large sun gear 32. A second one way clutch 52 for receiving a reaction force of the carrier 35 and a low-reverse brake 46 for fixing the carrier 35 are juxtaposed to each other. The through ring gear 36 is connected with the output gear 14 which the rotation is transmitted to right and left wheels 2a, 2b.

Table 1 shows operations of the respective frictional elements 41-46 such as clutches and brakes and one way clutches 51 and 52.

which is delivered from the oil pump 11 at a predetermined line pressure, and a throttle modulator valve 64 for providing a control pressure to the regulator valve 63. To the throttle modulator valve 64 is connected a constant pressure line 67 which is communicated through a reducing valve 66 with a main line 65 which is directly connected with the oil pump 11. The reducing valve 66 reduces the working hydraulic pressure of the main line 65 to a constant value.

The hydraulic control circuit 60 includes a regulator valve 61 for adjusting a hydraulic pressure delivered to a predetermined line pressure and a throttle modulator valve 64 for supplying a control pressure to the regulator valve 63. To the throttle modulator valve 64 is connected a constant pressure line 67 through a reducing valve 66 which reduces the working hydraulic fluid pressure of the main line 65 directly receiving from the pump 11 to a constant value. A pressure increasing line 68 is connected to a pressure increasing port 63a formed at one end of the throttle modulator valve 64. To a control port 54a at one end of the throttle modulator valve 64 is connected a pilot line 69 which branches off from the constant pressure line 67. A duty valve 62 is disposed on the pilot line 69 so as to control the line pressure. A pilot

TABLE 1

| RANGE | | FORWARD CLUTCH (41) | COAST CLUTCH (42) | 3-4 CLUTCH (43) | REVERSE CLUTCH (44) | 2-4 BRAKE (45) | LOW REVERSE BRAKE (46) | ONEWAY CLUTCH FIRST (51) | ONEWAY CLUTCH SECOND (52) |
|---|---|---|---|---|---|---|---|---|---|
| P | | | | | | | | | |
| R | | | | | O | | O | | |
| N | | | | | | | | | |
| D | 1 | O | | | | | | O | O |
|   | 2 | O | | | | O | | O | |
|   | 3 | O | O | O | | | | O | |
|   | 4 | O | | O | | O | | | |
| S | 1 | O | | | | | | O | O |
|   | 2 | O | O | | | O | | O | |
|   | 3 | O | O | O | | | | O | |
| L | 1 | O | O | | | | O | O | O |
|   | 2 | O | O | | | O | | O | |

In addition, the electric control unit (ECU) 70 for making an overall control of the engine 3 and the automatic transmission. The ECU 70 receives signals from a vehicle speed 71 for detecting a running speed of the vehicle 1, a throttle sensor 72 for detecting an opening of a throttle valve, an air flow sensor 73 for detecting an intake gas flow amount to the engine 3, an engine speed sensor 74 for detecting engine rotation speed, water temperature sensor 75 for detecting a temperature of a cooling water of the engine 3, a turbine sensor 76 for detecting a turbine speed or output speed of the torque converter 20, an output speed sensor 77 for detecting the output speed of the shift speed mechanism 30, shift position sensor 78 for detecting a shift position (shift range), hydraulic temperature sensor 79 for detecting a temperature of the working hydraulic fluid of the automatic transmission 4. The ECU 70 carries out a shift control by means of shift speed solenoid valves 61 in the hydraulic unit 60 and a line pressure control by means of a duty solenoid valve 62 in the hydraulic unit 60 for the automatic transmission, and an ignition control of the ignition plugs 7 for the engine 3. In the illustrated embodiment, a torque down control in which the output torque of the engine is reduced under a certain condition is carried out during a shift operation.

Hereinafter a line pressure control in the hydraulic pressure control unit 60 will be explained.

Figure 3:
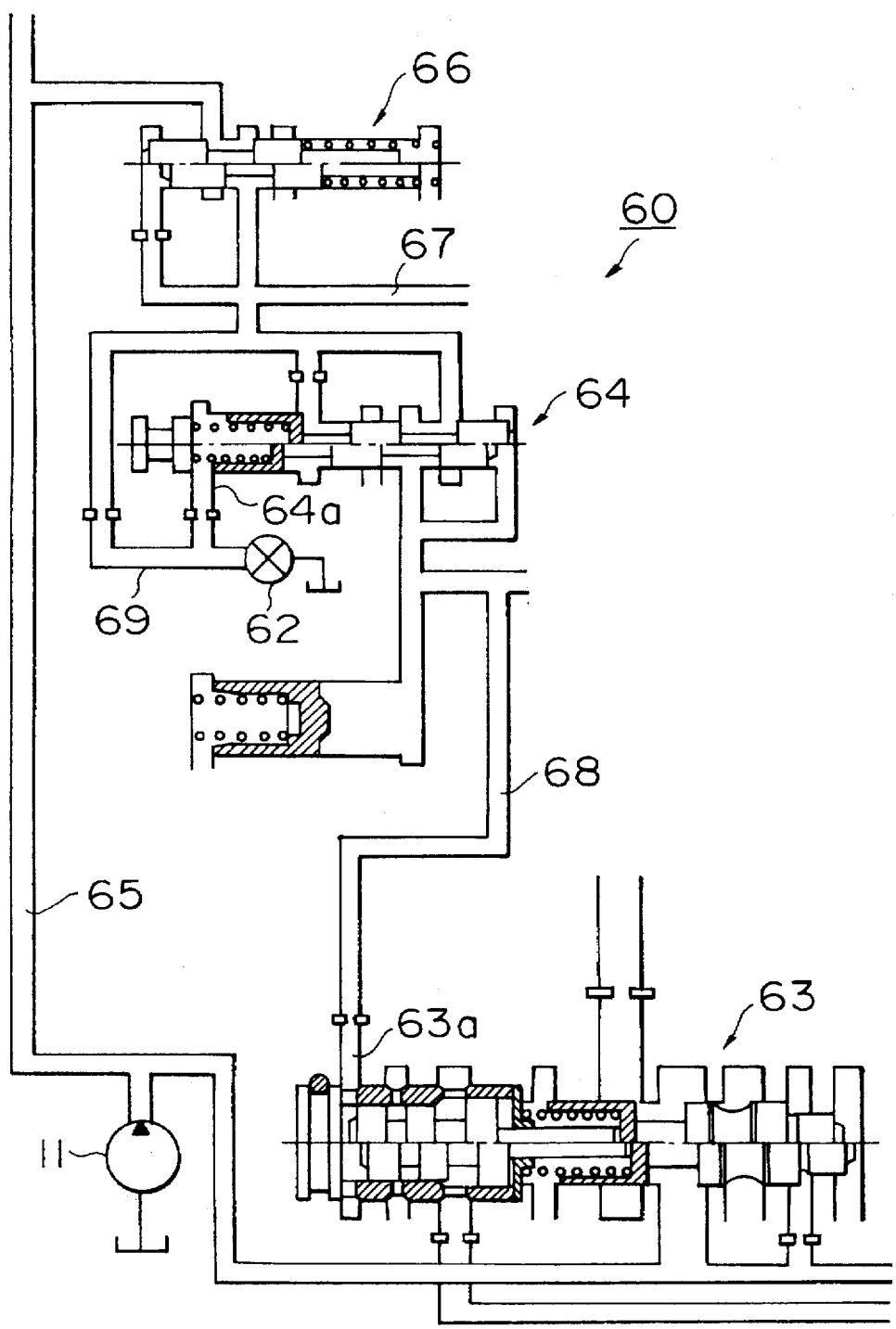
FIG. 3 is a view of the hydraulic control circuit for the line pressure control.

As shown in FIG. 3, there are provided a regulator valve 63 for adjusting a pressure of a working hydraulic fluid pressure in accordance with a duty ratio of the duty solenoid valve 62 is introduced to the control port 64a of the throttle modulator valve 64 so that the constant pressure from the pilot line 69 is adjusted to the pilot pressure or a pressure in accordance to the duty ratio and introduced to the pressure increasing port 63a of the regulator valve 63 through the pressure increasing line 68. Thus, the line pressure adjusted by the regulator valve 63 is resulted in a value in accordance with the duty ratio.

Figure 4:
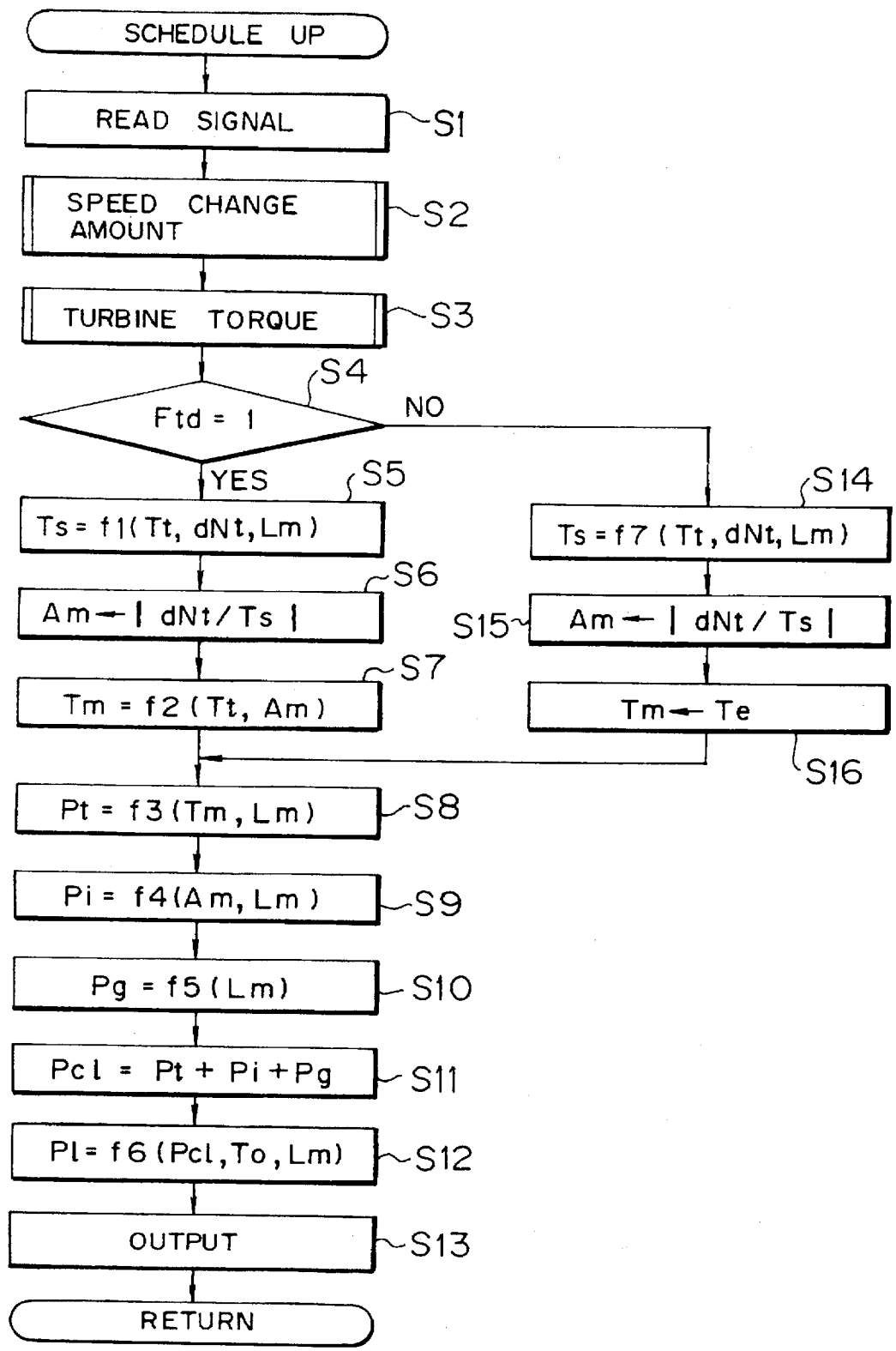
FIG. 4 is a flow chart of the line pressure control in an up-shift operation as the vehicle speed is increased (schedule up condition)

Next, the line pressure control in an up-shift operation in the case where the vehicle speed is increased (schedule up condition) will be explained taking reference with a flow chart shown in FIG. 4.

ECU 70 reads in various signals in step S1 and calculates a rotation speed change amount dNt of the turbine speed through the shift operation in accordance with a relation (1) in step S2 and a turbine torque Tt in step S3.

$$dNt = Nts - Nos*Go \qquad (1)$$

$$Tt = (Nts/Nes)*Te*t(2)$$

Wherein Nts is a turbine speed when a shift operation is found,

Nos is an output speed of the shift speed mechanism 30 when the shift operation is found, Go is a gear ratio when the shift operation is completed, Te is an engine torque, t is a torque amplification coefficient of the torque converter 20. The engine torque is obtained based on, for example, the engine speed, intake gas amount, ignition timing and the like.

Next, ECU 70 judges whether or not a torque down flag Ftd which shows that a torque down control is allowable is set at a value 1 in step S4. The torque down flag Ftd is set at the value 1 where the cooling water temperature shows that the vehicle is in a warmed condition.

Where ECU 70 found that the torque down flag Ftd is set at the value 1, ECU 70 calculates a target shift time Ts in light of a map of the target shift time for the torque down control in which the target shift time Ts is provided by the turbine torque Tt, speed change amount dNt and a target shift stage Lm as parameters in step S5. Then, ECU 70 calculates a target angular acceleration Am of the shift speed mechanism based on the following relation (3) in step S6.

$$Am = \text{absolute value of } dNt/Ts \quad (3)$$

Namely, the target angular acceleration Am is defined by dividing the speed change amount dNt by the target shift time Ts.

Figure 5:
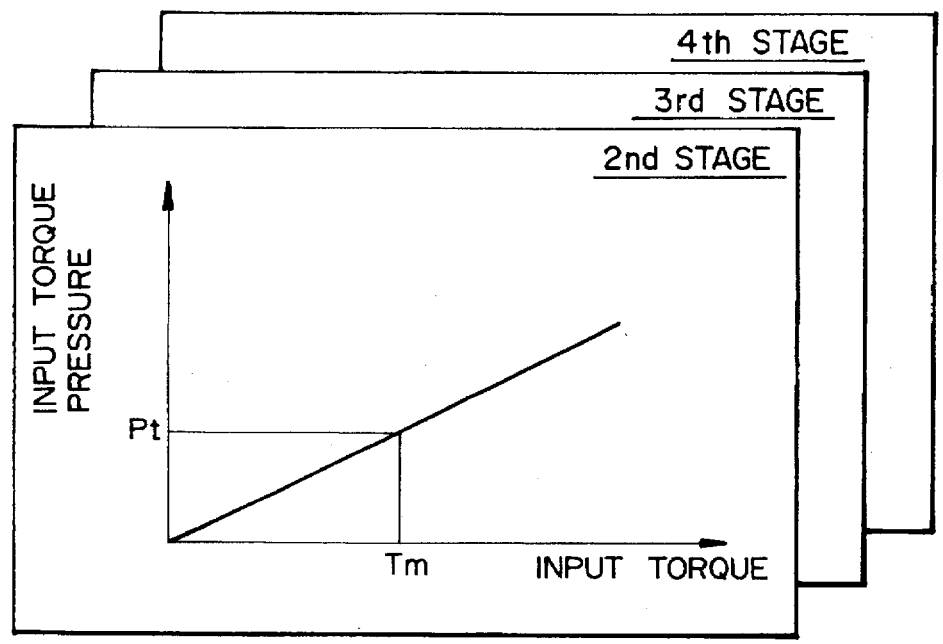
FIG. 5 is a view showing maps each providing a relationship between the input torque pressure and the input torque.
Figure 6:
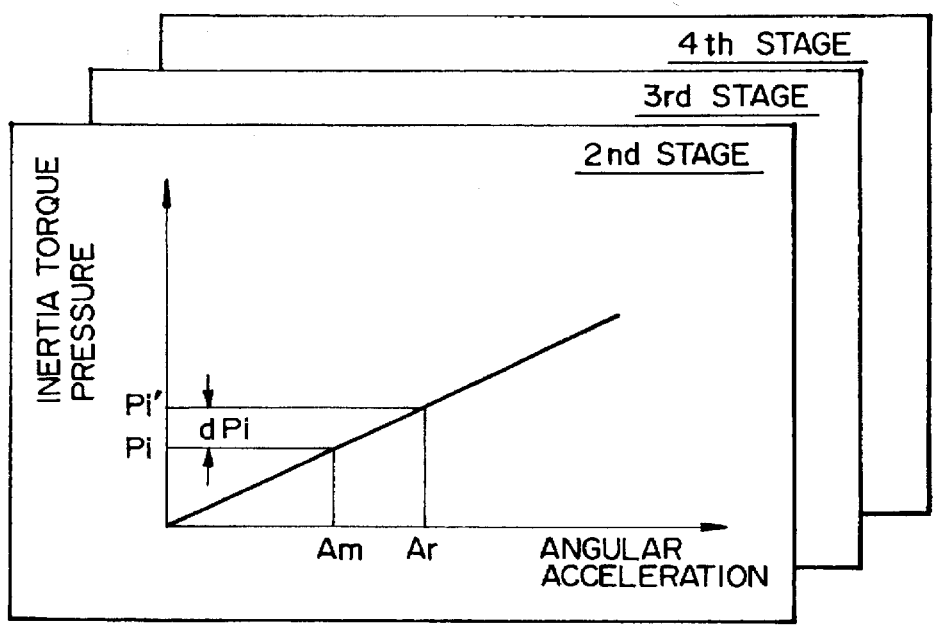
FIG. 6 is a view showing maps each providing a relation between the inertia torque pressure and the angular acceleration.

Next, ECU 70 carries out step S7 so as to calculates a target torque Tm during the shift operation corresponding to an actual turbine torque Tt and the target angular acceleration Am in accordance with a map in which the target torque is provided using the turbine torque and the angular acceleration as parameters. Then, in step S8, ECU 70 determines an input torque pressure corresponding to the target torque during the shift operation Tm based on an input torque pressure setting map in which the input torque pressure provided using an input torque to the shift speed mechanism as a parameter for each of the shift stages as shown in FIG. 5.

The input torque pressure setting map is prepared in a manner that the input torque pressure Pt is increased as the target torque of the shift operation Tm or input torque is increased.

ECU 70 carries out step S9 to set an inertia torque pressure Pi corresponding to the target angular acceleration Am based on an inertia torque pressure setting map which is provided for each of the shift stages using the angular acceleration as a parameter. The inertial torque setting map is prepared in a manner that the inertia torque pressure Pi is increased as the target angular acceleration Am is increased.

In step S10, ECU 70 reads out a learned hydraulic pressure corresponding to the current target shift stage Lm from a table of a learned hydraulic pressure for the up-shift operation which is provided for the respective shift stages and then executes step S11 to calculate a target engaging pressure Pc1 based on the inertia torque pressure Pi and the learned hydraulic pressure Pg in accordance following relation (4).

$$Pc1 = Pt + Pi + Pg \quad (4)$$

TABLE 2

| SHIFT STAGE | 2nd | 3rd | 4th |
|---|---|---|---|
| LEARNED HYDRAULIC PRESSURE | Pg1 | Pg2 | Pg3 |

For example, in an up-shift operation of first to second stage (1-2 shift operation), a value Pg1 is set as the learned hydraulic pressure.

Next, ECU 70 goes to step S12 and makes a hydraulic temperature compensation for the target engaging pressure Pc1 to determine a final target pressure P1.

Figure 7:
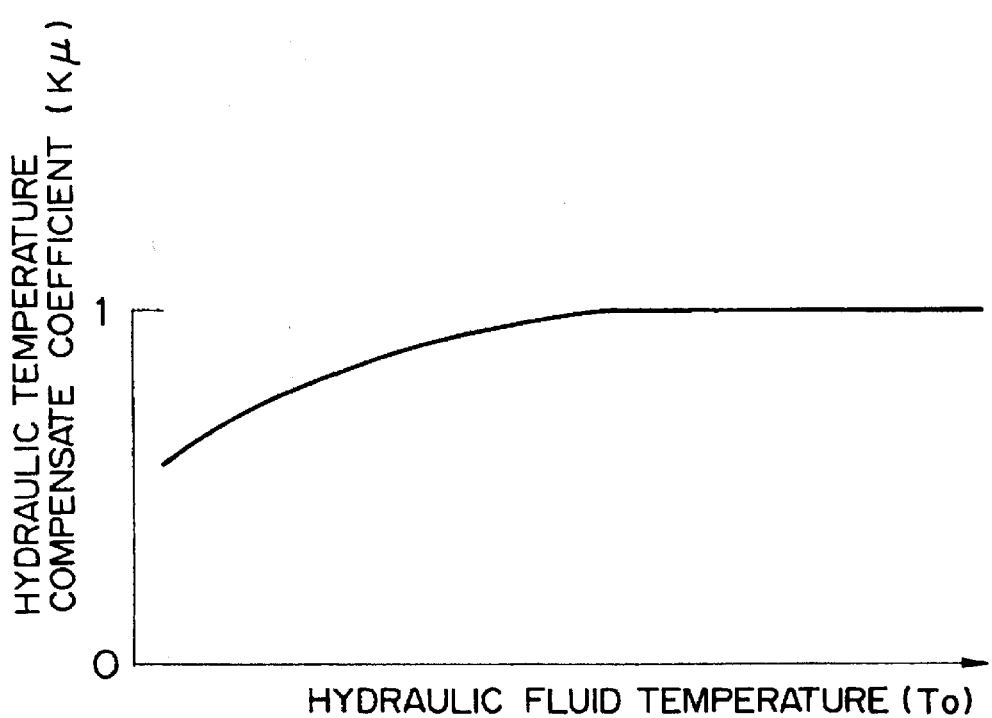
FIG. 7 is a graphical representation of a map used in the line pressure control providing a relation between the hydraulic temperature compensation coefficient and the temperature of the working hydraulic fluid.

Generally, the frictional elements of the shift speed mechanism 30 are frictionally engaged with each other to transmit the driving force therebetween. It will be understood that the frictional coefficients of contact surfaces of the engaging fictional elements are affected by the temperature To of the working hydraulic fluid intervening the two frictional elements. Specifically, the frictional coefficient μ is increased as the fluid temperature To is lowered. A fluid temperature compensation coefficient Kμ is read out from a table as shown in FIG. 7 for obtaining the coefficient Kμ using the fluid temperature To as a parameter. The final target line pressure P1 is determined based on a relation (5) using the coefficient μ and the target engaging pressure Pc1.

Then, ECU 70 executes step S13 to output the target line pressure P1 and the target torque of the shift operation Tm obtained in step S7.

As a result, in the automatic transmission 4, the duty solenoid valve 62 is controlled to provide the target line pressure P1 and the torque down control is made in accordance with a predetermined program to accomplish the target torque Tm for the shift operation.

Where the torque down control is available, the target torque Tm for the shift operation of the engine 3 is set based on the target angular acceleration Am and the turbine torque Tt. The input torque hydraulic pressure Pt corresponding to the input torque of the shift speed mechanism 30 is determined based on the target torque Tm for the shift operation so that the input torque pressure Pt appropriately matches the actual input torque transmitted to the shift speed mechanism 30.

On the other hand, where the torque down flag Ftd is not set at the value 1, in other words, where ECU 70 judges that the torque down control is not available, ECU 70 goes to step S14 to calculate the target shift time Ts in light of a map of the target shift time for a non torque down control which is prepared using the speed change amount dNt and the target shift stage Lm as parameters. In step S15, ECU calculates the target angular acceleration Am based on the (3) using the speed change amount and the target shift time Ts. In this case, the target shift times in the map for the non torque down control is longer than those for the torque down control.

In step S16, ECU 70 sets the engine torque Te as the target torque Tm of the shift operation. In this case, the torque down control is not executed.

Figure 8:
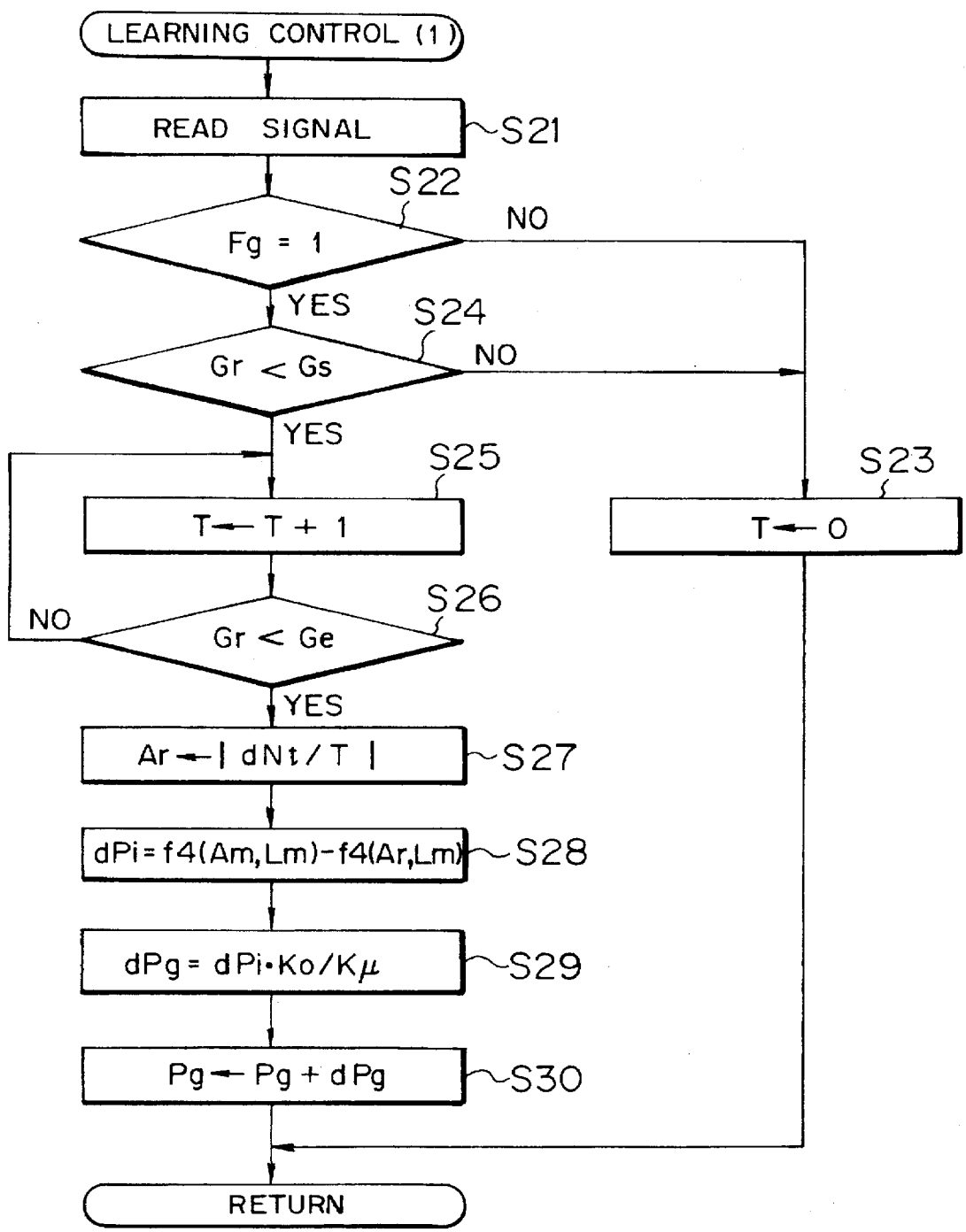
FIG. 8 is a flow chart of a learning control of an inertia torque pressure carried out concurrently with, the line pressure.

ECU 70 executes the line pressure control during the up shift operation as well as the learning control of the inertia torque P1 in accordance with a flow chart shown in FIG. 8.

ECU 70 reads, in step S21, various signals and judges whether or not a learning control flag Fg is set at a value 1. The learning control flag is set at the value 1 where the vehicle 1 is positively driven by the engine output. If the learning control flag Fg is not set at the value 1, ECU 70 executes step S23 to set a shift time timer at a timer value 0. On the other hand, if the learning control flag Fg is set at the value 1, ECU 70 goes to step S24 to judge whether or not the current gear ratio Gr of the shift speed mechanism 30 obtained from the turbine speed Nt and the output speed No is smaller than a predetermined reference value Gs for judging an initiation of the shift operation. Namely, ECU 70 judges whether or not the shift operation is actually initiated in this step.

Where ECU 70 found that the gear ratio Gr is smaller than the reference Gs for initiation of the shift operation, ECU 70 goes to step S25 to increment the timer value and, in step S26, judges whether or not the current gear ratio Gr is smaller than a predetermined reference value Ge for judging the completion of the shift operation. ECU 70 repeats the steps S25 and S26 until the judgment in step S26 turns out Yes. Where it is judged that the gear ratio Gr is smaller than the reference Ge, ECU 70 goes to step S27 to calculate an actual mean value Ar of the angular acceleration in accordance with a relation (6) based on an actual shift time T indicated by the timer value and the speed change amount dNt.

$$Ar = \text{absolute value of } (dNt/T) \quad (6)$$

In step S27, ECU calculates a compensation hydraulic pressure dPi. ECU 70 allots a difference of an inertia torque pressure Pi' to the compensation pressure dPi in light of the table of the inertia torque hydraulic pressure for the up-shift operation. The inertial torque pressure Pi' corresponds to the actual mean angular acceleration Ar for the inertia torque Pi providing the target angular acceleration Am determines the compensation pressure dPi. Where the actual means angular acceleration Ar is greater than the target angular acceleration Am, the compensation pressure dPi takes a negative value.

Next, ECU 70 executes step S29 to calculate a learned compensation hydraulic pressure dPg based on a relation (7) using the compensation pressure dPi obtained in step S28.

$$dPg = dPi \cdot Ko/K\mu \quad (7)$$

Wherein Ko is a coefficient showing an influence level or weight of the learning control.

Then the ECU 70 executes step S30 renews the learned hydraulic pressure Pg by adopting a value obtained by adding the learned compensation pressure dPg to the learned hydraulic pressure Pg of the precedent cycle.

Figure 9:
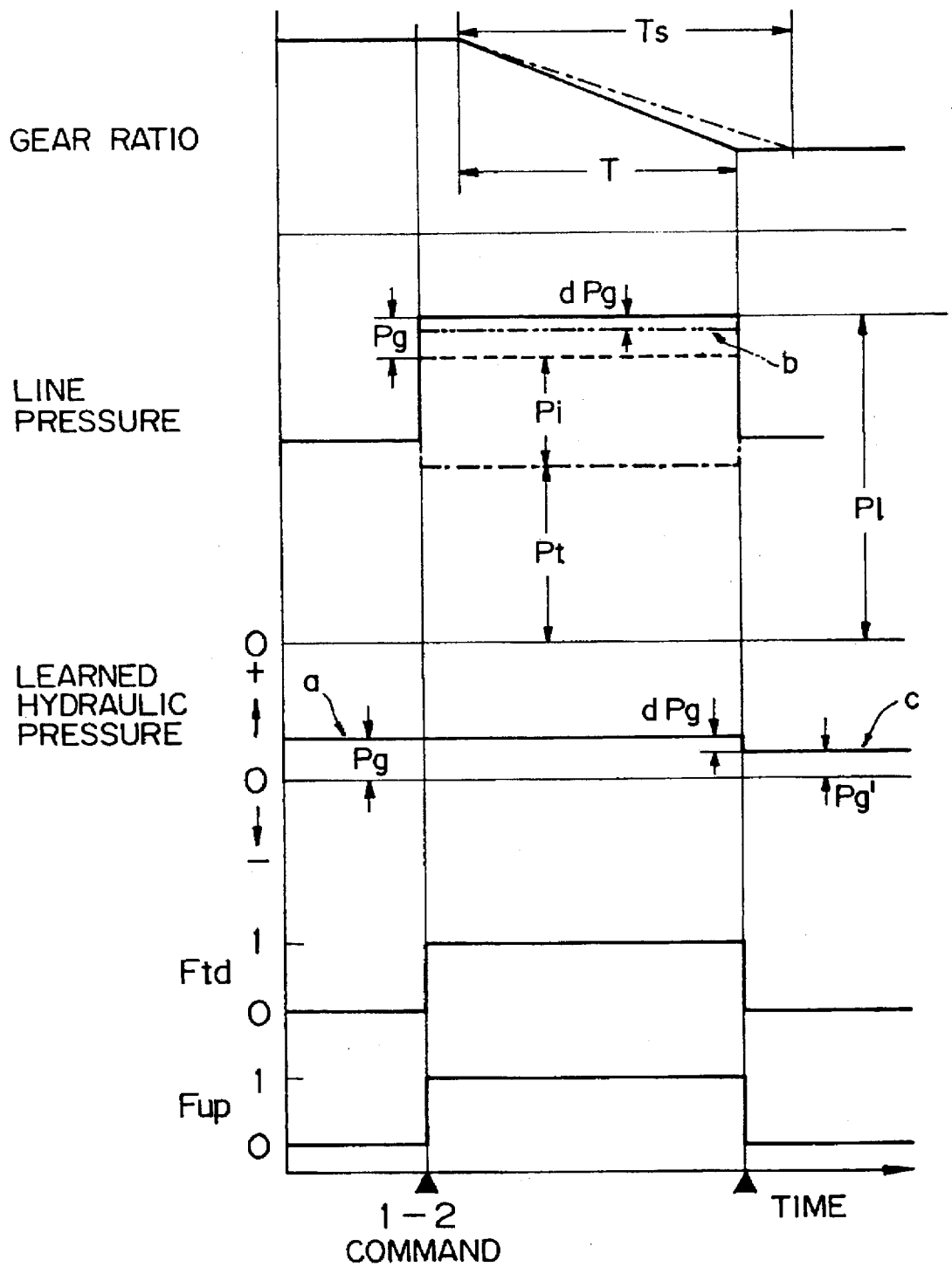
FIG. 9 is a time chart showing changes of variables in relation to the line control.

Specifically, supposing that the 1-2 up-shift operation is carried out in the case where the torque down control is available, the learned hydraulic pressure Pg is set based on the table of the learned hydraulic pressure for the up-shift operation shown in the table 1 as shown by an arrow (a) in FIG. 9. The target line pressure P1 is set as shown by an arrow (b) based on the learned hydraulic pressure Pg, input torque pressure Pt set according to the target torque for the shift operation Tm, inertia torque pressure Pi obtained from the inertia torque setting map. When the gear ratio Gr is converged to be converted to the gear ratio Ge for judging the completion of the shift operation, the learned hydraulic pressure Pg is renewed.

As shown in FIG. 9, where the actual shift time T is shorter than the target shift time Ts, the actual mean angular acceleration Ar is greater than the target angular acceleration Am so that the compensation hydraulic pressure dPi takes an negative value and thus the learned compensation pressure dPg takes a negative value too. Therefore, the learned compensation pressure Pg' of the current cycle takes a value which adds the learned compensation pressure dPg (negative value) to the learned hydraulic pressure dPg of the precedent cycle as shown by an arrow (c). In this case, the learned hydraulic pressure Pg (Pg1) corresponding to the second shift stage in the learned pressure table for the up-shift operation is renewed.

Then, the target line pressure P1 for the shift operation in the 1-2 up-shift operation is reduced by the learned compensation pressure dPg as shown by a double-dot chain line.

In this case, ECU 70 sets the target shift time based on the speed change amount of the turbine speed through the shift operation and the input torque to the shift speed mechanism and the target line pressure during the shift operation based on the angular acceleration providing the target shift time and the input torque so that the line pressure during the shift operation appropriately corresponds to the driving condition. In addition, the inertia torque pressure corresponding to the inertia torque caused by the speed change of the shift speed mechanism 30 during the shift operation is compensated by the means of learning control so that the optimized line pressure can be obtained corresponding to the change of the driving circumstances. In particular, the mean angular acceleration of the input member of the shift speed mechanism is employed as a parameter for the learning control so that a sophisticated result of the learning control can be obtained so as to provide an optimized line pressure during the shift operation.

Further, the angular acceleration of the turbine shaft is used as a parameter of the learning control. As a result, an improved learning control can be made by merely storing the learned hydraulic pressure for each of the shift stages to reduce a memory capacity. In particular, in the automatic transmission in which the torque down control is available, the learning control can be carried out irrespective of the execution of the torque down control. This provides the line pressure which is well matched to the driving conditions.

Figure 10:
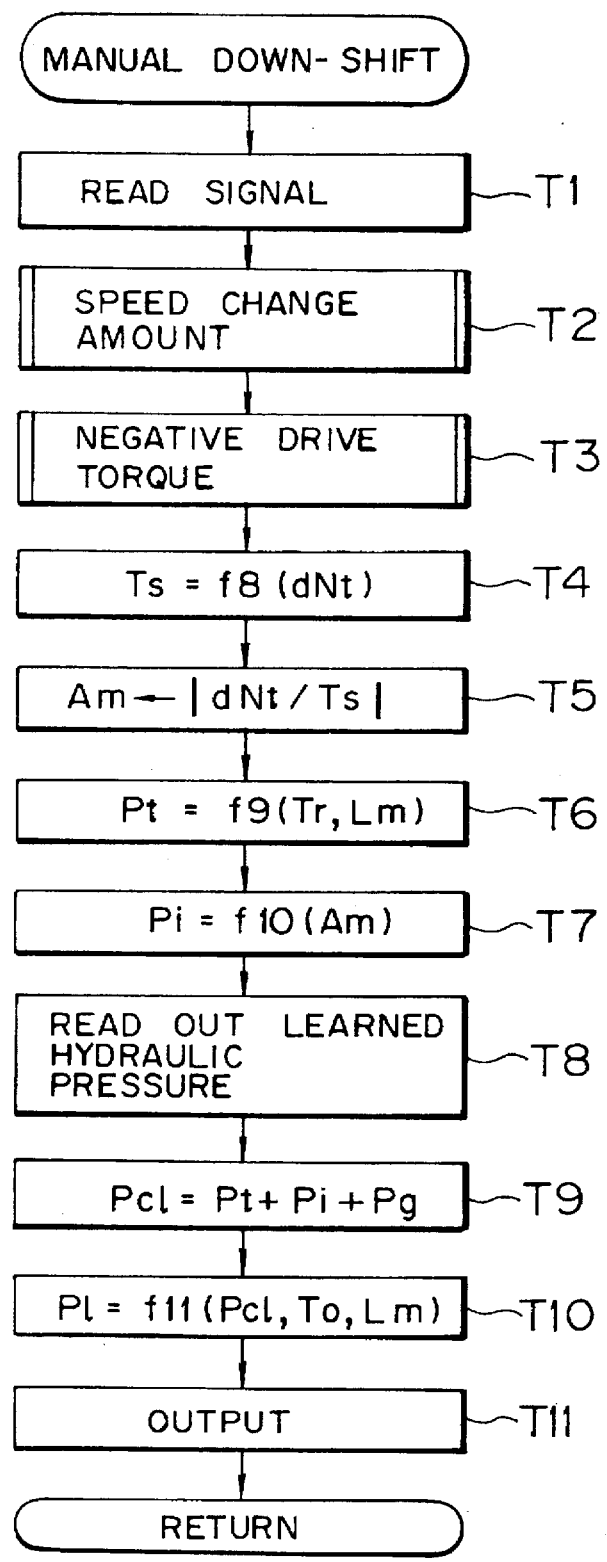
FIG. 10 is a flow chart of a line pressure control in a manual down-shift operation.

In the illustrated embodiment, it is described hereinafter that the line pressure control during a down-shift operation in which the shift operation is manually carried out by the driver's operation when the vehicle is driven by its own inertia, in other words, when the vehicle is negatively driven in accordance with a flow chart shown in FIG. 10.

ECU 70 reads in various signals in step T1 and calculates the speed change amount dNt of the turbine speed Nt though the shift operation in accordance with the following relation (8) in step T2. Then, ECU 70 calculates the negatively driven torque Tr, which is entered from the output member of the shift speed mechanism 30, based on the current vehicle speed V and the target shift stage Lm in step T3.

$$dNt = Nos \cdot GO - Nts \quad (8)$$

Wherein Nts is the turbine speed of the shift speed mechanism 30 when the shift operation is detected, Nos is the output speed of the shift speed mechanism 30 when the shift operation is detected, and Go is the gear ratio when the shift operation is completed.

Next, the ECU 70 goes to step T4 to calculate the target shift time Ts in light of the shift time map for the down-shift operation using the speed change amount dNt as a parameter, then in step T5, calculate the target angular acceleration Am of the input member of the shift speed mechanism based on the speed change amount dNt and the target shift time Ts.

Figure 11:
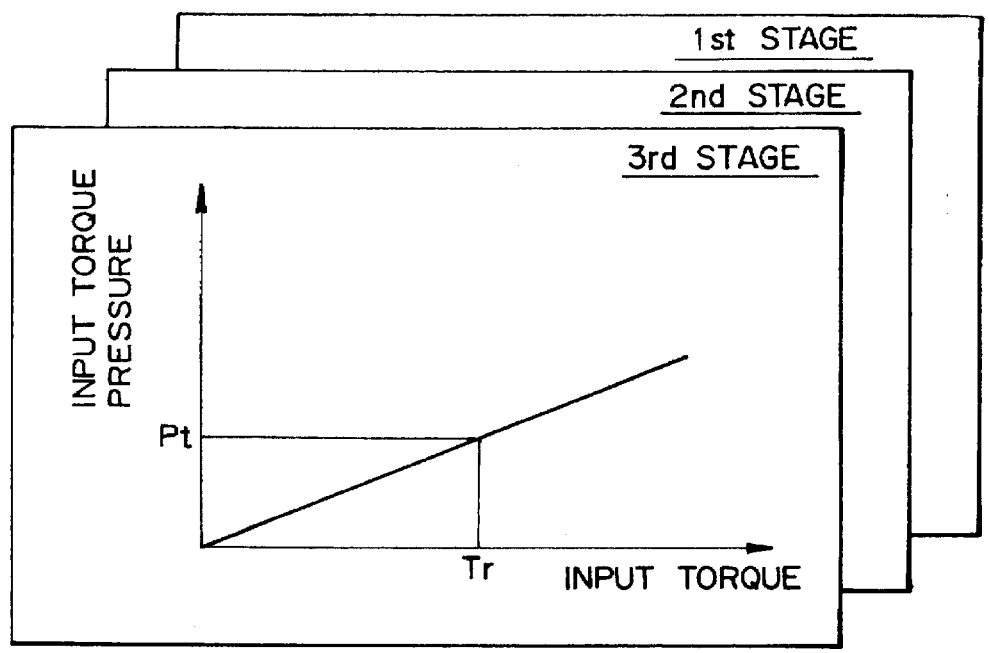
FIG. 11 is a view of maps each showing a relationship between the input torque pressure and the input torque for each of the shift stages.

Next, ECU 70 sets the input torque pressure Pt corresponding to the negatively driving torque Tr in light of the input torque pressure setting map which is prepared for each shift stage as shown in FIG. 11 using the input torque as a parameter.

In this case, the input torque pressure setting map is prepared in a manner that the input torque pressure Pt is increased as the negative driving torque Tr (input torque) is increased.

Figure 12:
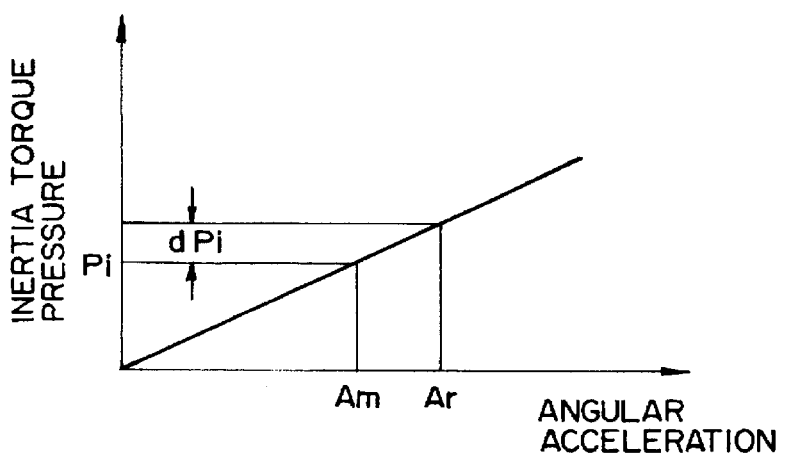
FIG. 12 is a graphical representation of a map used in the line pressure control showing a relationship between the inertia torque pressure and the angular acceleration.

ECU 70 executes step T7 to set the inertia torque pressure Pi corresponding to the target angular acceleration Am in light of the inertia torque pressure setting map prepared by using the angular acceleration as a parameter as shown in FIG. 12. In this case, the inertia torque pressure setting map is prepared in a manner that the inertia torque pressure map is increased as the target angular acceleration Am is increased.

Then, ECU 70 executes step T8 to read out the learned hydraulic pressure Pg from the learned pressure table for the down-shift operation and calculate the target engaging pressure Pc1 in accordance with the relation (4) based on the input torque pressure Pt, inertia torque pressure Pi and learned hydraulic pressure Pg. Next, ECU 70 goes to step and calculate the final target line pressure P1 by means of the hydraulic temperature compensation.

Namely, ECU 70 reads out the hydraulic temperature compensation coefficient Kμ corresponding to the current temperature To of the working hydraulic fluid and determine the final target line pressure P1 based on the relation (5) using the coefficient Kμ and the target engaging pressure Pc1.

Figure 13:
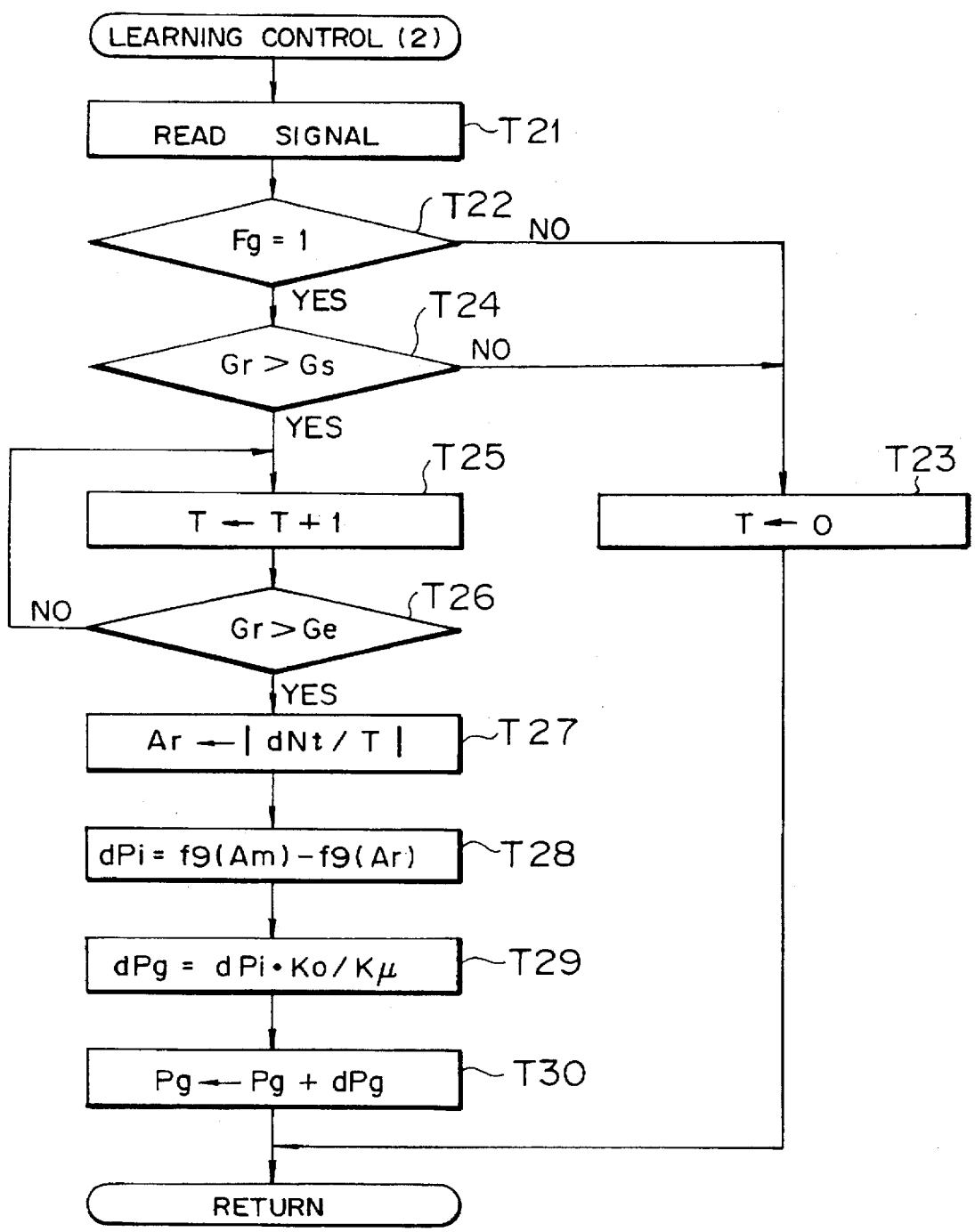
FIG. 13 is a flow chart of a learning control of an inertia torque pressure carried out concurrently with the line pressure control.

ECU 70 executes step T11 to output the target line pressure P1. In this case, ECU 70 carries out the learning control of the inertia torque pressure Pi in accordance with the routine shown in FIG. 13 as well as the line pressure control during the down-shift operation as aforementioned.

ECU 70 reads in various signals in step T21 and judges whether or not the learning control flag FG is set at the value 1. In this case, the learning control flag Fg is set at the value 1 in the down shift operation which occurs in an engine brake condition, in the negative driving condition of the vehicle where the vehicle runs due to its own inertia.

Where ECU 70 found that the learning control flag Fg is not set at the value 1, ECU 70 executes step T23 to set the timer value 0 of the shift time timer. On the other hand, where the flag Fg is set at the value 1, ECU 70 goes to step T24 and judges whether or not the current gear ratio Gr of the shift speed mechanism 30 is greater than the initial gear ratio Gs at the initiation of the shift operation.

Where the gear ratio Gr is greater than the initial gear ratio Gs in the step T24, ECU 70 goes to step 25 to increment the timer value and repeat this procedure until the gear ratio Gr is increased beyond the final gear ratio Ge which is a value when it is judged that the shift operation is completed, or until the judgment in step T26 is turned out Yes. If the current gear ratio Gr is greater than the final gear ratio Ge, ECU 70 goes to step T27 to calculate the actual mean angular acceleration Ar of the turbine shaft based on the following relation (6) using the actual shift time T indicated by the timer value and the speed change amount dNt.

Then, ECU 70 calculates the compensation hydraulic pressure dPi in step T28. Namely, ECU 70 assigns a difference between an inertia torque pressure Pi corresponding to the target angular acceleration Am an inertia torque pressure Pir to the compensation hydraulic pressure dPi in light of the inertia torque pressure table for the down-shift operation. In this case, the compensation hydraulic pressure takes a negative value too when the actual mean angular acceleration is greater than the target angular acceleration.

Next, ECU 70 executes step T29 to calculate the learned compensation pressure dPg based on the relation (7) using the compensation hydraulic pressure dPi obtained in step T28. Then, ECU 70 executes step T30 to renew the learned hydraulic pressure Pg by adopting a value adding the compensation pressure dPi to the precedent learned pressure Pg as a current value. Therefore, the inertia torque pressure is also appropriately compensated by means of the learning control in accordance with the change of the driving circumstances.

In the illustrated embodiment, the learned hydraulic pressure tables for the up-shift and down-shift are prepared irrespective of the speed change amount dNt. However, such learned hydraulic pressure tables can be prepared for each of the shift stages using the speed change amount dNt as shown in FIGS. 14 and 15 respectively.

As a result, even though the dynamic frictional coefficient of the contact surface of the frictional element is changed in accordance with the temperature of the working hydraulic fluid, an accurate learning control can be accomplished irrespective of the turbine speed amount through the shift operation.

Hereinafter, another embodiment of the present invention will be explained.

In the illustrated embodiment, the compensation coefficient for the temperature of the working hydraulic fluid is compensated by means of the learning control taking account of the frictional coefficient of the frictional element.

The basic concept of the control is as follows.

Assuming that the following relation (9) is provided, wherein angular acceleration is w1'(=dw1/dt), input torque Pi T1, engaging force needed for the frictional element is F1.

$$F1=h1(To)*\mu1*(f(w1')+g(T1)) \quad (9)$$

Wherein μ1 is frictional coefficient, h1(To) is compensation coefficient for the hydraulic temperature of the frictional coefficient, f(w1') is inertia torque pressure, g(T1) is input torque pressure.

In this case, if an actual engaging force is F2 in the case where the inertia torque pressure (=f(w1')), input torque pressure (=g(T1)), the following relation (10) is provided.

$$F2=h1(To)*\mu*(f(w1')+g(T1)) \quad (10)$$

Since it is assumed that the engaging force of the frictional element during the shift operation is proportional to the angular acceleration, the engaging force inferred by using the frictional coefficient μ1 can be shown by the following relation (11).

$$F3=h1(To)*\mu1*(f(w2')+g(T1)) \quad (11)$$

Assuming F2=F3, the following relation can be provided based on the formulas (10) and (11).

$$h1(To)*\mu2*(f(w1')+g(T1))=h1(To)*\mu1*(f(w2')+g(T1)) \quad (12)$$

Therefore, the coefficient μ2 can be expressed by the following relation (13).

$$\mu=\mu1*(f(w2')+g(T1))/(f(w1')+g(T1)) \quad (13)$$

Assuming that h2(To) is a compensation coefficient of the hydraulic temperature when the frictional coefficient is μ2, the following relation is provided.

$$h2(To)*\mu2=h1(To)*\mu1 \quad (14)$$

Modifying the formula (14), the following relation (15) can be obtained.

$$h2(To)=h1(To)*\mu1/\mu2 \quad (15)$$

Modifying the right hand side of the formula (15) by using the formula (13), the following relation (16) can be obtained.

$$h2(To)=h1(To)*(f(w1')+g(T1))/(f(w2')+g(T1)) \quad (16)$$

Rearranging the formula (16), the following relation (17) can be obtained.

$$h2(To)=h1(To)+h1(To)*(f(w1')-f(w2'))/(f(w2')+g(T1)) \quad (17)$$

Therefore, where the value h1(To) is compensated to accomplish the engaging force F1, the second term of the right hand side of the formula (17) is the learning control value.

Namely, The learning control value is provided as follows. The difference between the inertia torque pressure obtained from the angular acceleration, which is obtained from the target shift time, and the inertia torque pressure obtained from the angular acceleration, which is obtained from the actual shift time is calculated. The difference is divided by the inferred output pressure (=f(w2')+g(T1)) and multiplied by the temperature compensation coefficient to be the learning control value.

Next, a specific example of the line pressure control to which the above basic control concept on the hydraulic temperature compensation is applied is explained taking reference with FIGS. 16–19.

Figure 16:
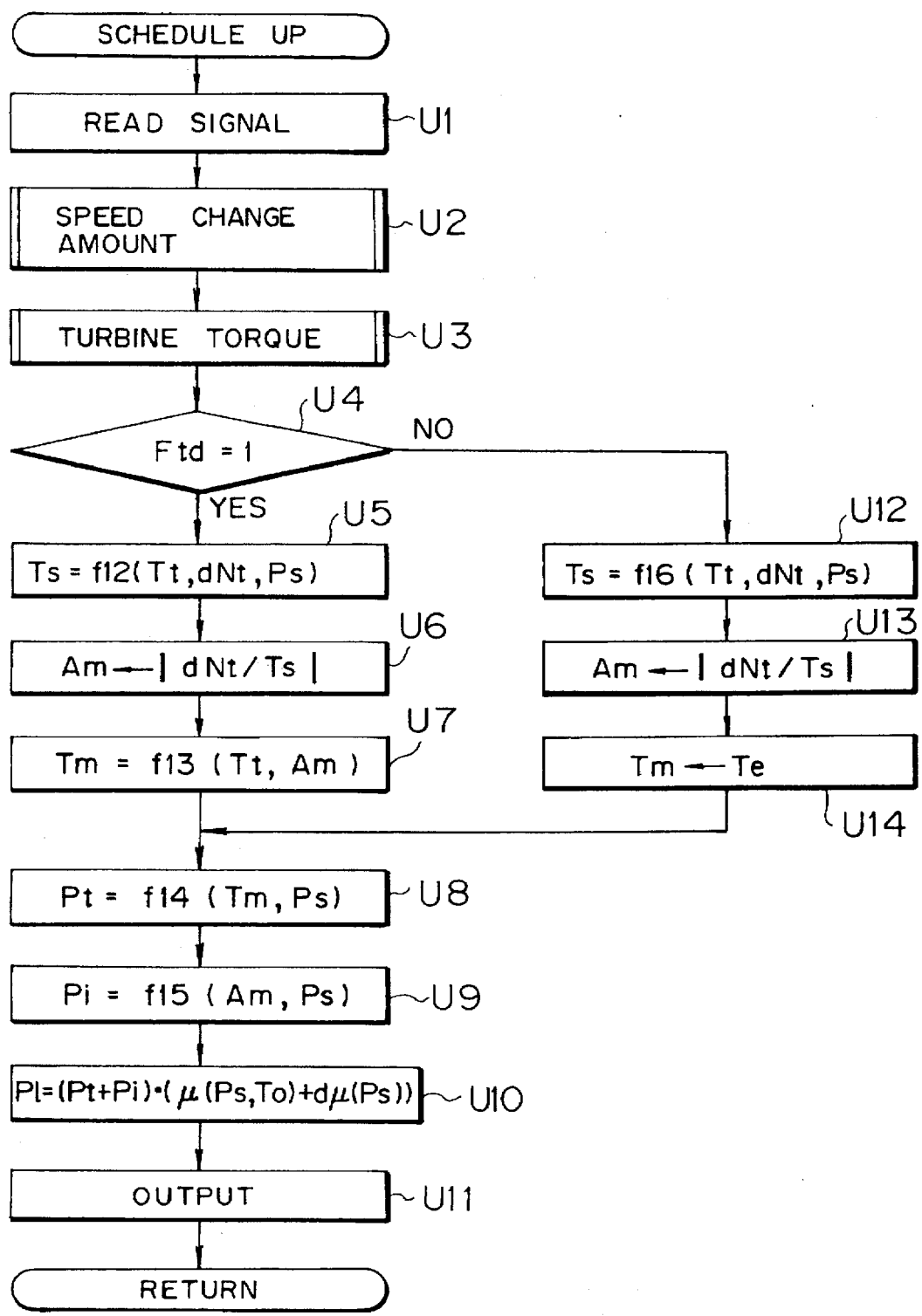
FIG. 16 is a flow chart of a line pressure control as the vehicle speed is increased in accordance with a further embodiment in which a hydraulic temperature compensation coefficient is compensated by means of the learning control.

In the illustrated embodiment, the line pressure control during the up-shift operation (the schdule up condition) is carried out in accordance with a flow chart as shown in FIG. 16.

ECU 70 reads in various signals in step U1 and calculates the rotation speed change amount dNt of the turbine speed Nt through the shift operation in accordance with a relation (1) in step U2 and the turbine torque Tt in step U3.

Next, ECU 70 judges whether or not the torque down flag Ftd is set at a value 1 in step U4.

Where ECU 70 found that the torque down flag Ftd is set at the value 1, ECU 70 calculates the target shift time Ts in light of a map of the target shift time for the torque down control in which the target shift time Ts is provided by the turbine torque Tt, speed change amount dNt and a shift pattern Ps as parameters in step U5. Then, ECU 70 calculates a target angular acceleration Am of the shift speed mechanism based on the following relation (3) in step U6.

Figure 17:
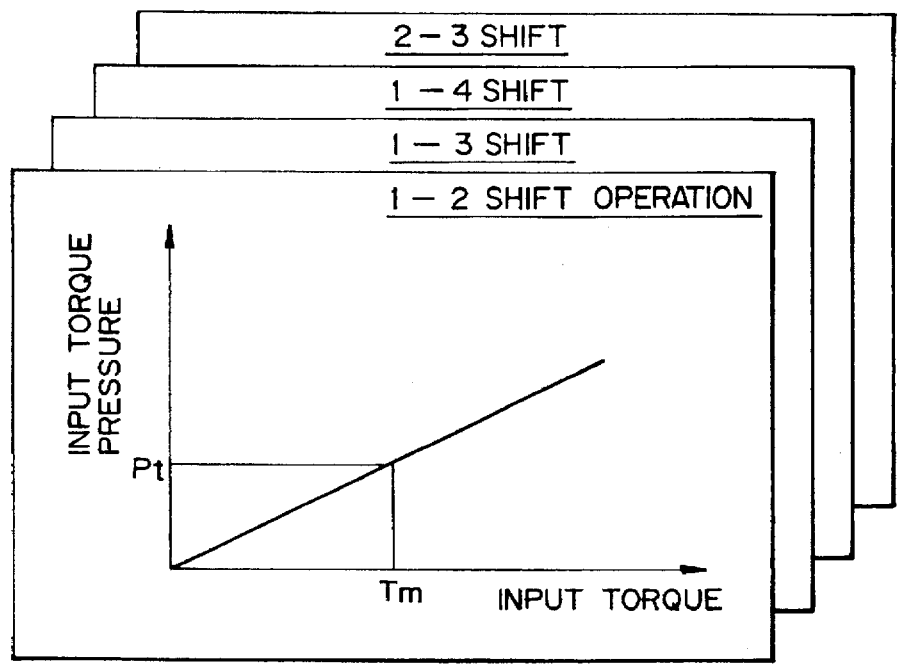
FIG. 17 is a view of maps each showing the relationship between the input torque pressure and input torque with regard to each of the shift pattern.

Next, ECU 70 carries out step U7 so as to calculates the target torque Tm during the shift operation corresponding to an actual turbine torque Tt and the target angular acceleration Am in accordance with a map in which the target torque is provided using the turbine torque and the angular acceleration as parameters. Then, in step U8, ECU 70 determines an input torque pressure Pt corresponding to the target torque Tm during the shift operation based on an input torque pressure setting map in which the input torque pressure provided using an input torque to the shift speed mechanism as a parameter for each of the shift patterns as shown in FIG. 17.

The input torque pressure setting map is prepared in a manner that the input torque pressure Pt is increased as the target torque Tm for the shift operation or input torque is increased.

Figure 18:
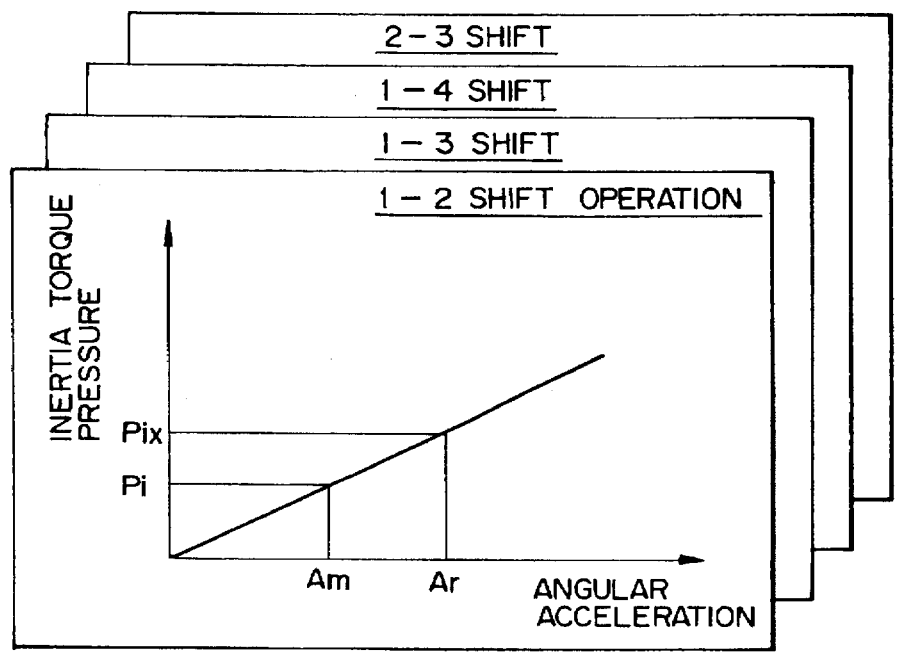
FIG. 18 is a view of maps each showing the relationship between the relationship between the inertial torque pressure and the angular acceleration for each of the shift pattern.

ECU 70 carries out step U9 to set an inertia torque pressure Pi corresponding to the target angular acceleration Am based on an inertia torque pressure setting map which is provided for each of the shift patterns using the angular acceleration as a parameter as shown in FIG. 18. The inertial torque setting map is prepared in a manner that the inertia torque pressure Pi is increased as the target angular acceleration Am is increased.

ECU 70 executes step U10 to calculate the target line pressure based on the following relation (18).

$$P1=(Pt+Pi)*(\mu(Ps, To)+d\mu(Ps)) \quad (18)$$

Wherein $\mu(Ps, To)$ is a basic hydraulic compensation coefficient corresponding to a first term of the right hand side of the relation (17), wherein the value $\mu(Ps, To)$ is set for each of the shift patterns using the temperature of the working hydraulic fluid, $d\mu(Ps)$ indicates the learning control value corresponding to the second term of the right hand side of the formula (17), which is provided for each of the shift patterns.

Then, ECU 70 executes step U11 to output the target line pressure P1 and the target torque Tm during the shift operation.

Thus, the duty solenoid valve 62 is controlled to accomplish the target line pressure P1 and the torque down control is carried out for the engine in accordance with a predetermined program to accomplish the target torque during the shift operation.

Thus, when the torque down control is available, the target engine torque Tm during the shift operation is determined based on the target angular acceleration Am and turbine torque Tt. The input torque pressure Pt corresponding to the input torque to the shift speed mechanism 30 is determined based on the target engine torque Tm during the shift operation. Therefore, the input torque pressure Pt set through the above procedure is well matched to the actual input torque to the shift speed mechanism 30.

On the other hand, if the torque down flag Ftd is not set at the value 1, ECU 70 goes to step U12 to calculate the target shift time Ts in accordance with the shift time map for the non-torque down control which is provided by using the turbine torque Tt, speed change amount dNt, shift pattern Ps as parameters. Then, in step U13, ECU 70 calculates the target angular acceleration Am based on the relation (3) using the speed change amount dNt and the target shift time TS. In this case, the target shift time for the non torque down control is greater than that for the torque down control.

Then, ECU 70 carries out step U14 to set the engine torque Te as a target engine torque Tm during the shift operation. In this case, the torque down control for the engine 3 is not carried out.

Figure 19:
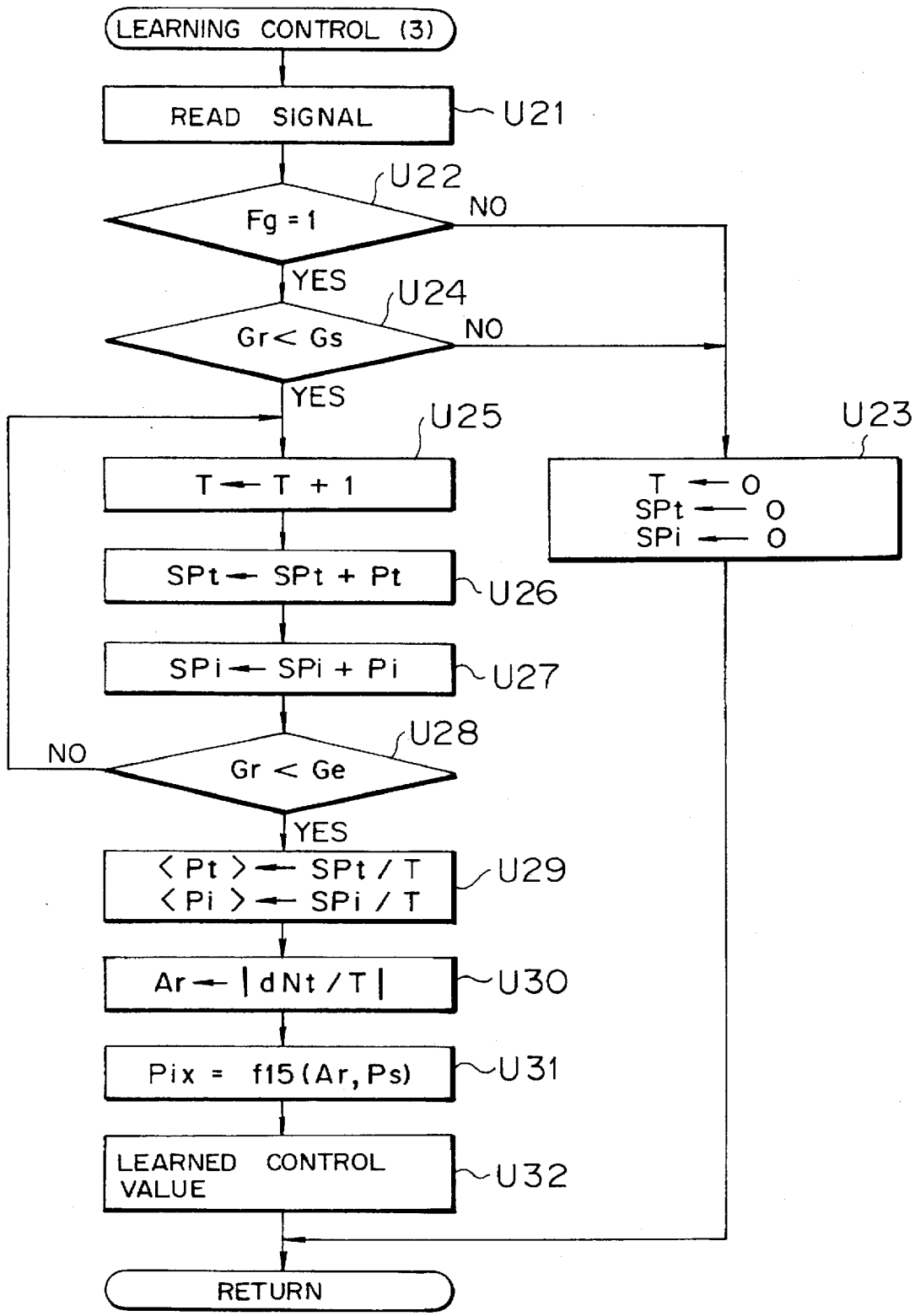
FIG. 19 is a flow chart of a learning control of the hydraulic temperature compensation carried out concurrently with the line pressure control.

Further, ECU 70 carries out the learning control for the hydraulic temperature compensation coefficient in accordance with a flow chart shown in FIG. 19 as well as the line pressure control in the up-shift operation.

Namely, ECU 70 reads, in step U21, various signals and judges whether or not the learning control flag Fg is set at a value 1 in step U22. If the learning control flag Fg is not set at the value 1, ECU 70 executes step U23 to set a shift time timer at a timer value 0, input torque pressure integrated value SPt and inertia torque pressure integrated value SPi. On the other hand, if the learning control flag Fg is set at the value 1, ECU 70 goes to step U24 to judge whether or not the current gear ratio Gr of the shift speed mechanism 30 obtained from the turbine speed Nt and the output speed No is smaller than the predetermined reference value Gs for judging an initiation of the shift operation.

Where ECU 70 found that the gear ratio Gr is smaller than the reference Gs for initiation of the shift operation, ECU 70 goes to step U25 to increment the timer value and, in step U26, adds the input torque pressure Pt to the input torque integrated value SPt of the precedent cycle of the program, and adds the inertia torque pressure Pi to the inertia torque pressure integrated value SPi of the precedent cycle in step U27. ECU 70 judges whether or not the current gear ratio is smaller than the predetermined reference value Ge for judging the completion of the shift operation. ECU 70 repeats the steps U27 and U28 until the judgment in step S28 turns out Yes. Where it is judged that the gear ratio Gr is smaller than the reference Ge, ECU 70 goes to step U29 to calculate actual mean values Pt and Pi of the input and the inertia torque pressures by dividing the input torque pressure integrated value SPt and the inertia torque pressure integrated value SPi by the actual shift time t indicated by the timer value. Then, ECU 70, in step U30, calculates the actual angular acceleration in accordance with the relation (6) based on the actual shift time T indicated by the timer value and the speed change amount dNt.

Then, ECU executes step U31 to calculate the inertia torque pressure inference value Pix. Namely, ECU 70 obtains the inference value Pix based on the mean angular acceleration in light of the inertia torque pressure table for the up-shift operation which is prepared for the line pressure control shown in FIG. 18.

Next, ECU executes step U32 renews the learned value dμ(Ps) based on the mean values of input and inertia torque pressures <Pt> and <Pi> and inertia torque pressure inference value Pix using a following relation (19).

$$d\mu(Ps)_{(i)}$$
$$d\mu(Ps)_{(i-1)}\mu(Ps,To)*(\langle Pi\rangle-Pix)/(\langle Pt\rangle+Pix)*K(Ps) \quad (19).$$

Wherein $d\mu(Ps)_{(i)}$ is a value of $d\mu(Ps)$ of the current cycle of the program, $d\mu(Ps)_{(i-1)}$ is a value of $d\mu(Ps)$ of the precedent cycle of the program, and, $K(Ps)$ is a coefficient indicating an influence level or weight of the learning control with regard to the shift pattern.

As shown in the formula (19), the mean value of the input torque pressure <Pt> is included in the formula for obtaining the learned value dμ(Ps) so that the line pressure control is converged smoothly even under a condition where the inertia torque pressure is not greatly varied.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A hydraulic control system for an automatic transmission comprising:
   a shift speed mechanism,
   a frictional element hydraulically controlled for switching a power transmitting path in the shift speed mechanism,
   a calculator for calculating separately an input torque pressure corresponding to an input torque introduced to the shift speed mechanism, an inertia torque pressure corresponding to an inertia torque which is changed in accordance with a speed change of the shift speed mechanism, and a working pressure, applied to the frictional element, produced by adding the input torque pressure to the inertia torque pressure,
   a working pressure controller for controlling an engaging force of the frictional element during a shift operation by adjusting said working pressure, and
   a learning control compensator for compensating the inertia torque pressure by a learning control.

2. A hydraulic control system for an automatic transmission comprising;
   a shift speed mechanism,
   a frictional element hydraulically controlled for switching a power transmitting path in the shift speed mechanism,
   a working pressure controller for controlling an engaging force of the frictional element during a shift operation by adjusting a working pressure applied to the frictional element,
   a target shift time setting device for setting a target shift time based on a speed change amount of an input member of the shift speed mechanism through the shift operation and an input torque introduced to the shift speed mechanism,
   a target acceleration calculator for calculating a target angular acceleration of the input member during the shift operation based on the target shift time and the speed change amount of the input member,
   a hydraulic pressure setting device for setting the working pressure based on the angular acceleration and the input torque calculated by the target acceleration calculator, acceleration detector for detecting an actual angular acceleration of the input member of the shift speed mechanism during the shift operation,
   an angular acceleration detecting device for detecting an actual angular acceleration of the input member of the shift speed mechanism, and
   a learning control compensator for compensating the working pressure for a next shift operation based on a difference between a mean angular acceleration of the input member after the shift operation and the target angular acceleration of the input member by means of the learning control in an up-shift operation where a vehicle is positively driven by an engine output.

3. A hydraulic control system as recited in claim 2 wherein the target shift time setting device sets the target shift time based on the speed change amount of the input member of the shift speed mechanism through the shift operation, and the target acceleration setting device calculates the target angular acceleration of the input member during the shift operation based on the target shift time and the speed change amount of the input member in a down-shift operation where the vehicle is negatively driven by an inertia of the vehicle.

4. A hydraulic control system as recited in claim 2 wherein the improvement further comprises a torque down device for executing a torque down control during the shift operation under a predetermined condition and the learning control compensator compensates the working pressure by means of the learning control even when the torque down control is not executed.

5. A hydraulic control system as recited in claim 4 wherein a learning control value is determined by the learning control compensator for each target shift stage.

6. A hydraulic control system as recited in claim 4 wherein the learning control value is determined based on the speed change amount of the input member of the shift speed mechanism through the shift operation.

7. A hydraulic control system as recited in claim 2 wherein a learning control value is determined by the learning control compensator for each target shift stage.

8. A hydraulic control system as recited in claim 2 wherein the learning control value is determined based on the speed change amount of the input member of the shift speed mechanism through the shift operation.

9. A hydraulic control system for an automatic transmission comprising;
   a shift speed mechanism,
   a frictional element hydraulically controlled for switching a power transmitting path in the shift speed mechanism,
   a working pressure controller for controlling an engaging force of the frictional element during a shift operation by adjusting a working pressure applied to the frictional element,
   a target shift time setting device for setting a target shift time based on a speed change amount of an input member of the shift speed mechanism through the shift operation and an input torque introduced to the shift speed mechanism,
   a target acceleration calculator for calculating a target angular acceleration of the input member during the shift operation based on the target shift time and the speed change amount of the input member, an inertia torque pressure setting device for setting an inertia torque pressure based on the target angular acceleration, an input torque pressure setting device for setting an input torque pressure based on said input torque introduced to the shift speed mechanism, a hydraulic pressure setting device for setting the working pressure based on the angular acceleration and the input torque calculated by the target acceleration calculator, acceleration detector for detecting an actual angular acceleration of the input member of the shift speed mechanism during the shift operation, an angular acceleration detecting device for detecting an actual angular acceleration of the input member of the shift speed mechanism, and a learning control compensator for compensating the working pressure for a next shift operation based on a difference between a mean angular acceleration of the input member after the shift operation and the target angular acceleration of the input member by means of the learning control in an up-shift operation where a vehicle is positively driven by an engine output.

10. A hydraulic control system as recited in claim 9 wherein the improvement further comprises a target torque setting device for setting a target torque transmitted through the shift speed mechanism based on said target angular acceleration and the input torque pressure setting means sets the input torque pressure based on said target torque.

11. A hydraulic control system as recited in claim 10 wherein the target shift time setting device sets the target shift time based on the speed change amount of the input member of the shift speed mechanism through the shift operation, and the target acceleration setting device calculates the target angular acceleration of the input member during the shift operation based on the target shift time and the speed change amount of the input member in a down-shift operation where the vehicle is negatively driven by an inertia of the vehicle.

12. A hydraulic control system as recited in claim 10 wherein a learning control value is determined by the learning control compensator for each target shift stage.

13. A hydraulic control system as recited in claim 10 wherein the learning control value is determined based on the speed change amount of the input member of the shift speed mechanism through the shift operation.

14. A hydraulic control system as recited in claim 9 wherein the target shift time setting device sets the target shift time based on the speed change amount of the input member of the shift speed mechanism through the shift operation, and the target acceleration setting device calculates the target angular acceleration of the input member during the shift operation based on the target shift time and the speed change amount of the input member in a down-shift operation where the vehicle is negatively driven by an inertia of the vehicle.

15. A hydraulic control system as recited in claim 9 wherein the improvement further comprises a torque down device for executing a torque down control during the shift operation under a predetermined condition and the learning control compensator compensates the working pressure by means of the learning control even when the torque down control is not executed.

16. A hydraulic control system as recited in claim 15 wherein a learning control value is determined by the learning control compensator for each target shift stage.

17. A hydraulic control system as recited in claim 15 wherein the learning control value is determined based on the speed change amount of the input member of the shift speed mechanism through the shift operation.

18. A hydraulic control system as recited in claim 9 wherein a learning control value is determined by the learning control compensator for each target shift stage.

19. A hydraulic control system as recited in claim 9 wherein the learning control value is determined based on the speed change amount of the input member of the shift speed mechanism through the shift operation.

20. A hydraulic control system for an automatic transmission comprising;

a shift speed mechanism, a frictional element hydraulically controlled for switching a power transmitting path in the shift speed mechanism, a working pressure controller for controlling an engaging force of the frictional element during a shift operation by adjusting a working pressure applied to the frictional element, a target shift time setting device for setting a target shift time based on a speed change amount of an input member of the shift speed mechanism through the shift operation and an input torque introduced to the shift speed mechanism, a target acceleration calculator for calculating a target angular acceleration of the input member during the shift operation based on the target shift time and the speed change amount of the input member, an inertia torque pressure setting device for setting an inertia torque pressure based on the target angular acceleration, an input torque pressure setting device for setting an input torque pressure based on said input torque introduced to the shift speed mechanism, a shift hydraulic pressure setting device for setting the working pressure based-on said input torque, inertia pressure and a compensation coefficient related to a hydraulic temperature determined taking account of a frictional coefficient of the frictional element involved in the shift operation, an angular acceleration detecting device for detecting an actual angular acceleration of the input member of the shift speed mechanism, an inertia torque pressure inference device for inferring the inertia torque pressure during the shift operation based on a mean angular acceleration of said rotation speed of the input speed of the shift speed mechanism when the shift operation is completed, and learning control compensator for compensating the compensation coefficient for a next shift operation by means of a learning control based on said inferred inertia torque pressure, the inertia torque pressure set by the inertia torque pressure setting device and the input torque pressure set by the input torque pressure setting device.

* * * * *